United States Patent

[11] 3,571,661

| [72] | Inventors | Blaine H. Schultz;<br>Oliver G. Attewell, South Milwaukee, Wis. |
|---|---|---|
| [21] | Appl. No. | 865,862 |
| [22] | Filed | Oct. 13, 1969 |
| [45] | Patented | Mar. 23, 1971 |
| [73] | Assignee | McGraw-Edison Company<br>Elgin, Ill. |

[54] RESTRAINT CONTROL FOR SECTIONALIZING SWITCH
21 Claims, 1 Drawing Fig.

[52] U.S. Cl............................................... 317/22,
317/31, 317/33, 317/27, 317/49
[51] Int. Cl................................................ H02h 7/26,
H02h 3/24
[50] Field of Search............................. 317/22, 27,
31, 33, 26, 36, 49

[56] References Cited
UNITED STATES PATENTS

| 3,255,384 | 6/1966 | Riebs............................ | 317/22 |
| 3,412,289 | 11/1968 | Gilker........................... | 317/22 |
| 3,418,529 | 12/1968 | Attewell........................ | 317/22X |

Primary Examiner—J. D. Miller
Assistant Examiner—Harvey Fendelman
Attorney—Richard C. Ruppin ABSTRACT: A restraint circuit for preventing operation of an automatic sectionalizing switch control which normally counts overcurrent occurrences and opens the switch after a predetermined number of overcurrent pulses occur. The restraint circuit utilizes switch control means for sensing overcurrent and includes means for sensing voltage loss. When a fault occurs in a system feeder line other than that in which the sectionalizing switch is connected and the circuit interrupter opens to deenergize the system, the restraint circuit is responsive to voltage loss unaccompanied by feeder line fault current as sensed by the switch control to prevent a counting operation by the switch control due to feeder line inrush current when the circuit interrupter recloses. The restraint circuit includes blocking means to prevent its operation when fault current is followed by voltage loss on the feeder line in which the sectionalizing switch is located.

PATENTED MAR 23 1971
3,571,661
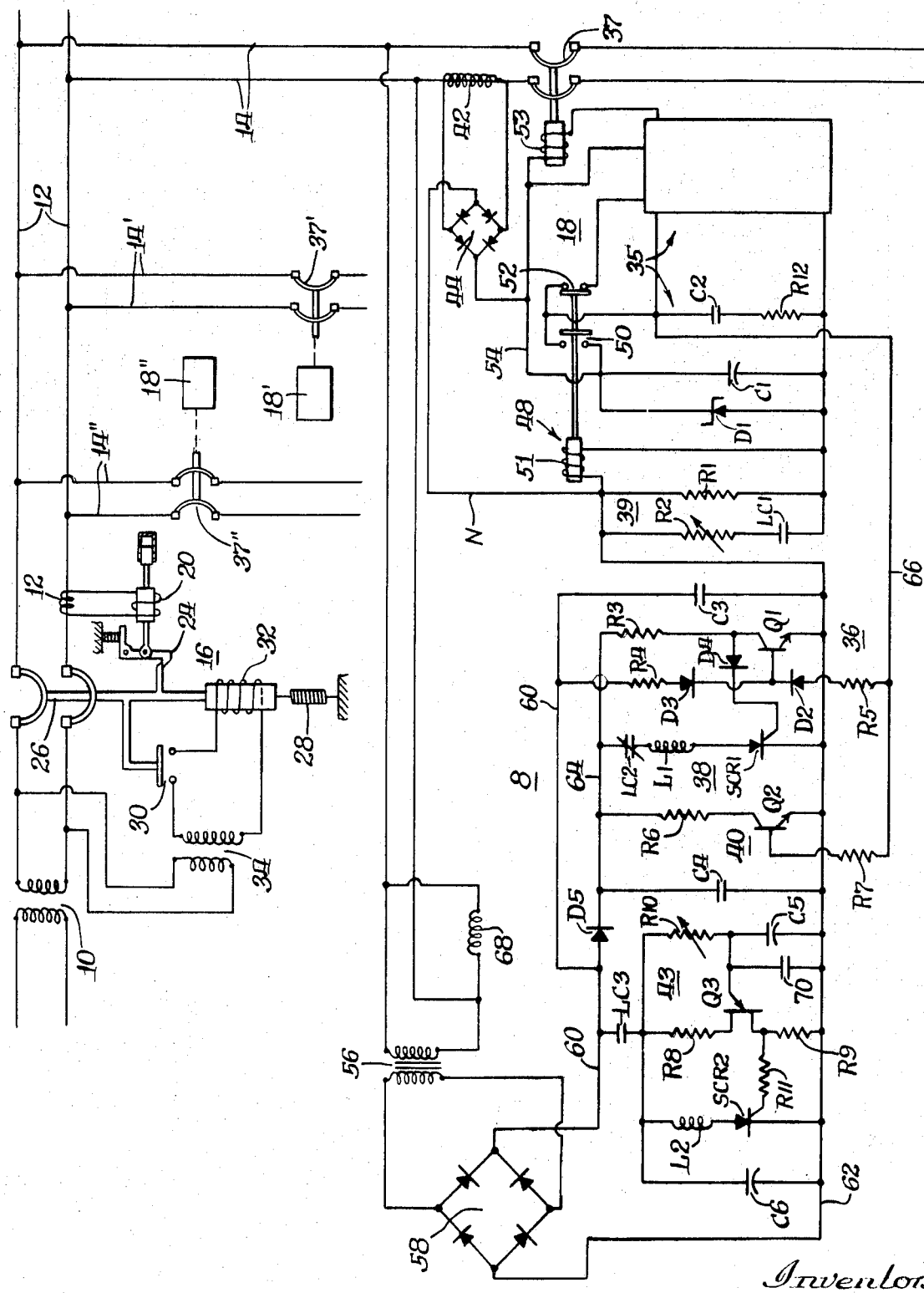
Inventors
Olliver G. Attewell
Blaine H. Schultz
By Richard C. Ruppin Atty.

RESTRAINT CONTROL FOR SECTIONALIZING SWITCH

This invention relates to a control circuit for protective devices and, more particularly, to a control circuit for automatic sectionalizing switches.

It is common practice in distribution systems to coordinate a repeating circuit interrupter connected in series with the main distribution line and located adjacent the source of power, and sectionalizing switches disposed in feeder lines radiating from the main line. Because the majority of faults in such systems are temporary in nature and will clear in a relatively short time, it is common to adjust the repeating circuit interrupter to execute a series of successive opening and reclosing operations, during which time the sectionalizing contacts remain closed. If the fault has not cleared after a predetermined number of such opening and reclosing operations, usually three, it is considered permanent, in which case it should be isolated from the source.

If the fault is on the load side of a sectionalizing switch in a feeder line, the sectionalizing switch in that line will open subsequent to the third opening operation of the circuit interrupter, thereby isolating the fault from the main line. For this purpose, sectionalizing switches are provided with fault integrating means which count the number of fault current impulses and then operate switch opening means to isolate the faulted feeder line from the main line while the circuit to the remaining feeder lines remains closed. The opening of the sectionalizing switch contacts takes place while the repeating circuit interrupter is open, so that the sectionalizing switch is not required to have fault interrupting capacity. After the sectionalizing switch in the faulted section has opened, the repeating circuit interrupter again recloses to restore service to the nonfaulted feeder lines. If, on the other hand, the permanent fault exists on the source side of a sectionalizing switch, the sectionalizing switch will remain inactive while the repeating circuit interrupter cycles to lockout, so that when service is restored in the main line, the feeder line will be immediately energized.

A problem that arises in the operation of the sectionalizing switch counting means is that it will respond to any high current having a value equal to or greater than a predetermined fault current value. For example, if a fault occurs in part of the system other than the feeder line in which the sectionalizing switch is located, the circuit interrupter will deenergize the system. Upon reclosing of the interrupter and reenergization of the system, the inrush current into the feeder line through the sectionalizing switch may be sufficient to cause the counting means to perform a counting operation upon reopening of the interrupter due to the fault continuing elsewhere in the system. As a result, coordination between the repeating circuit interrupter and the sectionalizing switch is lost and the sectionalizing switch will not operate at the proper time in the event of a closely following fault in the feeder line.

It is a principle object of the invention to provide a control for restraining operation of a sectionalizing switch upon the occurrence of a voltage loss not caused by fault current through the sectionalizing switch.

Another object of the invention is to provide a control for restraining operation of a sectionalizing switch when voltage loss unaccompanied by overcurrent occurs and permitting operation of the sectionalizing switch when voltage loss accompanied by overcurrent occurs.

Another object of the invention is to provide in an electrical system having a reclosing circuit breaker for deenergizing and reenergizing the system upon occurrence of a fault overcurrent therein, a control for a feeder sectionalizing switch which is responsive to a lack of voltage not preceded by overcurrent through the sectionalizing switch for modifying for a predetermined time, upon reenergizing of the system, the level of a signal indicative of overcurrent through the sectionalizing switch.

A further object of the invention is to provide a control for restraining operation of a sectionalizing switch control and which permits operation of the sectionalizing switch control in response to operation of an input portion of the sectionalizing switch control.

The objects of the invention are achieved by providing a first circuit means effective upon loss of voltage in the feeder line to which the sectionalizing switch is connected to modify the signal level at which the counting means of the sectionalizing switch control will respond upon subsequent reenergization and presence of voltage on the feeder line. A second circuit means is provided which is operable during normal energized conditions of the feeder line to block actuation of the first circuit means and to continue blocking of the first circuit means upon loss of voltage accompanied by overcurrent in the feeder line. The second circuit means is further operable to discontinue blocking actuation of the first circuit means upon loss of voltage in the feeder line unaccompanied by overcurrent therein.

Other objects and advantages of the invention will in part be obvious and will in part appear hereinafter. For a fuller understanding of the nature and objects of the invention, reference should be had to the following detailed description taken in connection with the accompanying drawing which schematically illustrates a sectionalizer and a control therefor according to the instant invention.

Referring to the drawing in greater detail, an electrical distribution system is illustrated as having a source of power symbolized by a transformer 10, a main line section 12 in series with the source of power and a plurality of feeder lines 14, 14' and 14" radiating from the main line. The system also includes a circuit interrupter 16 of the repeating type disposed in the main line 12 adjacent the source of power 10 and sectionalizers 18, 18' and 18", disposed in feeder lines 14, 14' and 14", respectively, adjacent their junctions with the main distribution line 12. Each of the sectionalizer switches 18, 18' and 18" is identical and only a portion of 18 is shown in detail for the sake of simplicity.

Upon the occurrence of a fault in the main line 12 or in one of the feeder lines 14, 14' or 14", the trip coil 20 of the repeating circuit interrupter 16 senses the fault through current transformer 22 which couples it to the system 12. After a time delay, the tip coil 20 releases a latch 24 which allows the main switch 26 to open under the influence of an opening spring 28. When the main switch 26 reaches its fully opened position, an auxiliary switch 30 is closed to couple a closing coil 32 to the source side of contacts 26 through a stepdown transformer 34, so that the main switch 26 is again reclosed. If the fault has cleared during the opening cycle, the main switch 26 will remain closed. If, however, the fault does not clear during this interval, there follows a predetermined number of successive opening and closing operations followed by the locking open of the main switch 26 by a lockout means which is not shown but which is well known in the art.

The details of the automatic circuit interrupter just discussed form no part of the instant invention and therefore have been schematically illustrated and described only in general terms. For a more complete description of a circuit interrupter capable of performing these functions, reference is made to U.S. Pat. No. 2,835,763 issued to A. Van Ryan et al. on May 20, 1958.

The sectionalizing switch 18 is of a type well known in the art and, except for the portion of sectionalizing switch 18 that cooperates with the present invention, it will not be described in detail herein. For a detailed description of sectionalizing switch 18, reference is made to U.S. Pat. No. 3,418,529, issued to O. G. Attewell on Dec. 24, 1968. The sectionalizing switch 18 as shown in the drawing comprises switch means 37, switch opening means 53, switch actuating and counting means 35 and a signal level circuit 39. The signal level circuit 39 includes current transformer 42, bridge rectifier 44 connected between conductors N and 54, signal level resistor R1 and variable signal level resistor R2. The resistor R2 is also connected in series with normally open latching relay contacts LC1, which will be described in detail hereinafter. When the contacts LC1 are closed, the resistor R2 is effectively connected in the signal level circuit 39 in parallel with resistor R1. The actuating and counting means 35 includes an energy source capacitor C1 coupled to the feeder lines 14 through current transformer 42 and rectifier 44. In this manner the rectified current in the secondary of current transformer 42 maintains the energy source capacitor C1 fully charged. In order to limit the voltage across the energy source capacitor C1 to the desired value, it is shunted by a Zener diode D1 which bypasses the charging current around said capacitor when the latter is fully charged. The actuating and counting means 35 also includes an overcurrent relay 48 having a coil 51 connected in parallel with resistors R1 and R2 and in series with the charging circuit comprising energy source capacitor C1, normally open contacts 50 and normally closed contacts 52.

The operation of the sectionalizing switch 18 is as follows. Upon overcurrent and loss of voltage caused by a fault on the load side of the sectionalizing switch 18, a current signal indicative of the overcurrent in lines 14 and of a level sufficient to operate relay 48 is produced to the coil 51 by the signal level circuit 39. Upon the operation of relay 48 and the closing of contacts 50, a circuit is completed between capacitor C1 and a series circuit comprising transfer capacitor C2 and resistor R12 so that a portion of the charge on capacitor C1 is redistributed on capacitor C2. Since a fault overcurrent also causes the operation of trip coil 20 of recloser 16, the main switch 26 opens to interrupt the current in the main distribution line 12 and the feeder lines 14, 14' and 14''. As described in detail in aforementioned U.S. Pat. No. 3,418,529, upon opening of circuit breaker contacts 26 and the consequent opening of relay contacts 50 and closing of relay contacts 52, charge from capacitor C2 is utilized to complete a counting operation of the actuating and counting means 35. Described briefly, each time an overcurrent occurs on the load side of sectionalizing switch 18, charge is transferred from capacitor C1 to capacitor C2 and a counting operation is performed. After a predetermined number of current signals are produced to coil 51 and a corresponding number of counting operations are performed, the switch opening means 53 is energized to open the switch means 37. Inasmuch as the contacts of switch means 37 are not designed to have an interrupting rating of fault current magnitude, the timing of the counting and actuating means 35 is such that the switch means 37 is opened while the main contacts 26 of circuit interrupter 16 are open. The opening of the switch means 37 isolates the fault in the feeder lines 14 so that upon the subsequent closing of the main contacts 26 of circuit interrupter 16, current conditions in the system will have returned to normal. Thus, contacts 26 will not reopen and continued service will be resumed in the main line 12 and the other feeder lines 14' and 14''.

The sectionalizing restraint circuit 8 includes a voltage supply transformer 56 connected across the feeder lines 14 and a bridge-type rectifier 58 connected to the secondary of the transformer 56 and to the conductors 60 and 62 of the restraint circuit 8. The restraint circuit 8 also includes a sensing circuit 36, a signal level modifying circuit 38, a blocking circuit 40 and a timing circuit 43. The sensing circuit 36 includes transistor Q1 having its collector-emitter circuit connected across conductors 64 and 62 through bias resetting resistor R3. The base of transistor Q1 is connected to conductor 60 through current limiting resistor R4 and diode D3. The base of transistor Q1 is also connected through diode D2, current limiting resistor R5 and conductor 66 to the junction between capacitors C1 and C2 when contacts 50 are closed. The sensing circuit 36 also includes the capacitor C3 connected across the bridge 58 through conductors 60 and 62. The capacitor C3 is further connected to the base of transistor Q1 through diode D3 and resistor R4 and to the collector of transistor Q1 through diode D5 and resistor R3. It may be readily seen that when feeder lines 14 are energized, the capacitor C3 is maintained charged through rectifier 58 and transformer 56. Also, when there is voltage on feeder lines 14, the transistor Q1 is forward biased and in a conducting state. Further when an overcurrent occurs on feeder lines 14 so that relay 48 operates and closes contacts 50, transistor Q1 is maintained in a conducting state by energy from capacitor C1 and capacitor C3 until capacitor C3 is discharged.

The signal level modifying circuit 38 includes a normally open latching relay contact LC1 connected in series with signal level resistor R2, a latching relay coil L1 connected in series with its own normally closed latching contact LC2 and a silicon-controlled rectifier SCR1. The gate of SCR1 is connected through diode D4 to the junction between resistor R3 and the collector of transistor Q1. As may be readily apparent from an examination of the circuit, when transistor Q1 is in a conducting state the coil L1 and SCR1 are shunted and thereby prevented from operating. It may be noted that the diode D4 provides a voltage drop between the collector of transistor Q1 and the gate of SCR1 equal to the voltage drop across the collector-emitter circuit of transistor Q1 so that the voltage at the collector of transistor Q1 does not gate SCR1. The modifying circuit 38 also includes the capacitor C4 for supplying energy to coil L1 when SCR1 is gated. The diode D5 prevents the forward biasing of transistor Q1 by capacitor C4 when voltage is not present on feeder lines 14 and thus across conductors 60 and 62.

The blocking circuit 40 includes the transistor Q2 having its collector-emitter circuit connected across conductors 64 and 62 through bias setting resistor R6. The base of transistor Q2 is connected through current limiting resistor R7 to the junction between capacitor C1 and C2 when the contacts 50 of relay 48 are closed. Thus, only when contacts 50 are closed and energy from capacitor C1 is applied to the base of transistor Q2, does transistor Q2 become conductive.

The timing circuit 43 includes a latching relay coil L2 and a normally open latching relay contact LC3 of the aforementioned latching relay. The latching relay is of a type well known in the art and maintains its contacts in the state shown in the drawing subsequent to energization of coil L2 and in a state opposite to that shown in the drawing subsequent to energization of coil L1 until coil L2 is energized. The timing circuit 42 also includes unijunction transistor Q3 having its base-one-base-two circuit connected in series with contact LC3 through bias setting resistors R8 and R9. A variable resistor R10 and capacitor C5 are serially connected with contact LC3 to conductor 60. The emitter of transistor Q3 is connected to the junction between resistor R10 and capacitor C5. A relay 68 is connected across the primary of transformer 56 and has contacts 70 connected in parallel with capacitor C5. The latching relay coil L2 and silicon controlled rectifier SCR2 are serially connected with latching contact LC3 to the conductor 60. The gate of SCR2 is connected through bias setting resistor R10 to the base-two of transistor Q3. A latching relay supply capacitor C6 is connected in parallel with relay coil L2 and the anode-cathode circuit of SCR2.

The operation of the restraint circuit 8 in conjunction with the actuating and counting means 35 is as follows. During normal operating conditions of the distribution system and feeder lines 14, the level of the signal produced to the relay 48 by the signal level circuit 39 is insufficient to switch relay 48 from its condition shown in the drawing to the condition in which contacts 50 are closed and contacts 52 are open. Consequently, there is no transfer of energy from capacitor C1 to capacitor C2 or to transistor Q1 and Q2. Also, during normal operating conditions of the feeder lines 14, the capacitors C3 and C4 are maintained in a charged state, transistor Q1 is conducting to shunt the modifying circuit 38 and the timing circuit 42 is deenergized inasmuch as contact LC3 is open. In the event that an overcurrent due to a fault on the load side of the sectionalizing switch 18 occurs, the feeder lines 14 and the main line 12 of the distribution system will also lose voltage. The signal level circuit 39, with resistor R1 effectively connected across coil 51 and resistor R2 disconnected due to the open state of contacts LC1, will produce a current signal to the relay 48 indicative of the fault overcurrent on the feeder lines 14 so that the relay 48 will close contacts 50 and open contacts 52. Closing of contacts 50 allows charge to be transferred from capacitor C1 to capacitor C2 and makes energy from capacitor C1 available for forward biasing of transistor Q1 and Q2. The loss of voltage on feeder lines 14 also causes loss of voltage across conductors 60 and 64 and 62 so that capacitors C3 and C4 are the only remaining energy sources in the restraint circuit 8. Since the transistor Q2 is now forward biased by energy from capacitor C1, the transistor Q2 will become conductive to discharge capacitor C3 and discharge capacitor C4 so that the latter will not be available to energize latching relay coil L1. Also, transistor Q1 is maintained in a conductive state to aid in the discharge of capacitors C3 and C4 and continue shunting the modifying circuit 38 until capacitors C3 and C4 are discharged.

Since the overcurrent condition in the feeder lines 14 also causes the contacts 26 of repeating circuit interrupter 16 to open, the values of the components of actuating and counting means 35 of sectionalizing switch 18, including capacitors C1 and C2, are chosen such that the transfer of charge from capacitor C1 to C2 and the completion of a counting operation occurs before the contacts 26 of the repeating circuit interrupter 16 are again closed. The details of this operation, including actuation of the opening means 53 after a predetermined number of counts are made, are described in the aforemention U.S. Pat. No. 3,418,529. When the contacts 26 of circuit interrupter 16 open to deenergize the main line 12 and the feeder lines 14, the relay 48 returns to its original position as shown in the drawing to open contacts 50 and remove the biasing potential on the bases of transistors Q1 and Q2. Since it is desired that the modifying circuit 38 does not become operative upon the occurrence of a fault current on feeder lines 14, the components of the restraint circuit 8 have been chosen such that the capacitors C3 and C4 are discharge within a short time after the occurrence of the fault current and voltage loss on feeder lines 14. Thus, upon the opening of the interrupter contacts 26, the capacitors C3 and C4 will have been discharged and the latching relay coil L1 will not have been energized so that the modifying circuit 38 will not have been actuated to its second state.

In the event of a fault current and accompanying voltage loss in a different section of the distribution system and the consequent opening of the circuit interrupter contacts 26, there will be a voltage loss on the feeder lines 14. However, this voltage loss will not be preceded by an overcurrent on feeder lines 14. In this situation, there will be a voltage loss across the conductors 60 and 64 and 62 of the restraint circuit 36, but the contacts 50 of the relay 48 will not be closed and energy from capacitor C1 will not be available to forward bias the transistors Q1 and Q2. Thus, transistor Q1 remains conductive until insufficient charge remains on capacitor C3 to forward bias transistor Q1. Energy from capacitor C4 then gates SCR1 through resistor R3 and diode D4 and SCR1 becomes conductive to discharge capacitor C4 through relay coil L1 to energize the latter and switch the latching relay to its second state in which contacts LC2 are open and contacts LC3 and LC1 are closed. Closing of contacts LC1 modifies the signal level circuit 39 for relay 48 by inserting the variable resistor R2 in parallel with resistor R1 and coil 51. Upon reclosing of the contacts 26 of repeating circuit interrupter 16, the inrush load current in feeder lines 14 will be similar to the overcurrent caused by a fault in feeder lines 14. However, connecting of resistor R2 in the signal level circuit 39 decreases the signal produced to the coil 51 so that the relay 48 will not respond to the inrush load current. It may be noted that the value of R2 is chosen such that the signal produced to coil 51 due to the inrush load current is insufficient to cause relay 48 to operate, but if a new fault is present on the load side of switch 18 upon the reclosing of contacts 26 the signal to coil 51 will cause relay 48 to operate. The reclosing of the contacts 26 also again places voltage across the conductors 60 and 64 and 62 so that capacitor C5 in timing circuit 42 commences to charge and upon reaching the potential necessary to fire unijunction transistor Q3, the latter will become conductive to gate SCR2 and energize coil L2 of the latching relay. The time required for capacitor C5 to reach the firing potential of transistor Q3 is determined by the value of capacitor C5 and the setting of variable resistor R10. In accord with the objects of the invention, the variable resistor R10 is set such that SCR2 will not be fired and coil L2 energized until the inrush load current has subsided. When the coil L2 is energized, the latching relay switches to its first state to open contacts LC3, LC1 and close contacts LC2. The capacitor C6 functions to insure that the coil L2 switches the contacts LC1, LC2 and LC3 to their first state, as shown in the drawing, when contact LC3 opens during the switching operation. The relay contacts 70 are open when the relay 68 is energized during the presence of voltage on feeder lines 14 and are closed when the feeder lines 14 are deenergized by opening of contacts 26. The contacts 70 function to discharge capacitors C5 and C6 when the contacts LC3 are closed and the circuit breaker contacts 26 are open after a previous momentary closure so that capacitor C5 will start charging from a zero charge condition upon reclosing of contacts 26.

It may thus be appreciated that the restraint circuit 8 functions to permit operation of the actuating and counting means 35 and sectionalizing switch 18 upon reenergization of the feeder lines 14 subsequent to a voltage loss accompanied by the fault current on feeder lines 14 and prevent operation of the actuating and counting means 35 and the sectionalizing switch 18 upon reenergization of the feeder lines 14 subsequent to a loss of voltage on the feeder lines 14 which was not accompanied by an overcurrent condition.

While only a single embodiment of the invention has been shown and described, it is not intended to be limited thereby but only by the scope of the appended claims.

We claim:

1. In a protective device coupled to an electrical system and including switch means, switch opening means, signal means for producing an electrical signal upon the occurrence and disappearance of an abnormal electrical current in said system and actuating circuit means for counting a series of said signals and actuating said opening means after a predetermined number of signals occur, the combination comprising:
    first circuit means coupled to said actuating circuit means and said system and being operative in response to a lack of one of said signals accompanied by a change in condition of said electrical system to modify said signal means whereby the level of the signal produced by the latter means is reduced; and
    second circuit means coupled to said first circuit means and said actuating circuit means for preventing said operation of the first circuit means in response to the actuating circuit means upon occurrence of one of said signals.

2. The combination according to claim 1 wherein said first circuit means includes signal level modifying means coupled to said signal means for changing the level of the signals produced by said signal means.

3. The combination according to claim 2 wherein said first circuit means includes switching means having a first state preventing operation of said signal level modifying means and being operative to a second state to actuate the signal level modifying means in response to said lack of a signal from the signal means accompanied by a change in condition of the electrical system.

4. The combination according to claim 3 wherein said switching means is in its first state when said electrical system is in a normal operating condition and is maintained in said first state in response to said second circuit means when the actuating circuit performs a counting operation upon occurrence of one of said signals.

5. The combination according to claim 3 wherein said switching means comprises a bypass circuit conductive while the switching means is in said first state to shunt said signal level modifying means.

6. The combination according to claim 3 wherein said switching means includes energy source means effective when the switching means is in its second state to actuate said signal level modifying means.

7. The combination according to claim 6 wherein:
    said switching means is maintained in said first state in response to said second circuit means upon the occurrence of one of said signals; and said energy source means is deenergized by said switching means when the latter means is maintained in said first state by said second circuit means.

8. The combination according to claim 6 wherein said energy source means comprises energy storage means maintained energized when said electrical system is in a normal operating condition.

9. In a protective device coupled to an electrical system and including switch means, switch opening means, signal means for producing an electrical signal upon the occurrence and disappearance of an abnormal electrical current in said system and actuating circuit means responsive to signals above a predetermined level for counting a series of signals above said level and actuating said opening means after a predetermined number of said signals occur, the combination comprising:
  signal level modifying means coupled to said signal means for changing the level of the signals produced by said signal means to a value below said predetermined level; and
  sensing means effective during normal operating conditions of said electrical system to prevent operation of said modifying means and being responsive to a lack of one of said signals accompanied by a change in condition of said electrical system to permit operation of said modifying means whereby signals above said level are not available to the actuating circuit means, said sensing means being responsive to the occurrence of a signal above said level accompanied by a change in condition of said electrical system to maintain said modifying means inoperative whereby signals above said level are available to the actuating means.

10. The combination according to claim 9 wherein:
said sensing means includes first switch means maintained in a first state by energy supplied thereto and being in a second state when energy is not supplied thereto, said first switch means being effective when in said first state to prevent operation of said modifying means and effective when in said second state to permit operation of said modifying means;
first energy source means coupled to said system; and
second switch means responsive to a signal above said level for coupling said energy source means to said first switch means whereby operation of said modifying means is prevented.

11. The combination according to claim 10 wherein:
said signal level modifying means includes third switch means having a normal first state and changing to a second state when energy is supplied thereto, said third switch means rendering said modifying means inoperative when in said first state and operative when in said second state; and
second energy source means responsive to a lack of a signal from said signal means followed by said changed in condition of the electrical system to supply energy to said third switch means when said first switch means is in its second state.

12. The combination according to claim 9 wherein said signal level modifying means includes timing means for maintaining said modifying means operative a predetermined time.

13. The combination according to claim 12 wherein:
said timing means is effective when energized to maintain said modifying means operative a predetermined time;
said signal level modifying means includes third switch means having a normal first state and changing to a second state when energy is supplied thereto, said third switch means preventing operation of said modifying means when in said first state and permitting operation of the modifying means when in said second state, said third switch means also coupling said timing means to said system when the third switch means is in its second condition whereby the timing means may be energized by the system; and
second energy source means responsive to said change in condition of the system to supply energy to said third switch means when said first switch means is in its second state.

14. In a protective device coupled to an electrical system and including switch means, switch opening means, signal means for producing an electrical signal upon the occurrence and disappearance of an overcurrent in said system and actuating means responsive to a series of signals each above a predetermined level for counting a series of said signals and actuating said opening means after a predetermined number of signals above said level occur, the combination comprising:
  first circuit means coupled to said system and to said signal means for modifying said signal means whereby a signal below said level is produced; and
  second circuit means coupled to said system, to said first circuit means and to said actuating means and being effective during normal operating conditions of said system to prevent operation of said first circuit means, said second circuit means being responsive to said actuating means upon the occurrence of said overcurrent followed by loss of voltage in said system to prevent operation of said first circuit means whereby said signal means produces signals above said level and said actuating means responds thereto, said second circuit means being responsive to a loss of voltage on said system not preceded by said overcurrent to permit operation of said first circuit means whereby said first circuit means modifies said signal means following return of voltage to said system.

15. The combination according to claim 14 wherein said second circuit means includes a first bypass circuit shunting said first circuit means during normal operating conditions of said system and being responsive to said actuating means upon the occurrence of said overcurrent to continue shunting said first circuit means.

16. The combination according to claim 15 wherein said second circuit means includes first energy storage means for maintaining said first bypass circuit in a shunting condition while the latter circuit is responsive to said actuating means.

17. The combination according to claim 15 wherein:
said first bypass circuit is rendered ineffective to shunt said first circuit means following loss of voltage in said system not preceded by said overcurrent; and
said first circuit means includes second energy storage means for actuating said first circuit means when said bypass circuit becomes ineffective.

18. The combination according to claim 17 wherein said second circuit means includes a second bypass circuit responsive to said actuating means upon occurrence of said overcurrent to discharge said second energy storage means whereby actuation of said first circuit means is prevented.

19. The combination according to claim 17 wherein said first circuit means includes timing means for controlling the time the first circuit means modifies the level range of said signals following return of voltage to said system, said timing means including energy storage means for determining the timing duration of said timing means.

20. The combination according to claim 19 wherein:
said first circuit means has one condition in which said signal means is unmodified and a second condition in which the signal means is modified, said first circuit means being in said one condition while said first bypass circuit is shunting said first circuit means during normal operating conditions of said system and being in said second condition while said first bypass circuit is ineffective following said loss of voltage not preceded by an overcurrent, said first circuit means being transferred from said one condition to the other condition by energy from said second energy storage means; and
said timing means includes a first switching circuit effective at the termination of said time duration to return the first circuit means from said one condition to said other condition.

21. In a sectionalizing switch coupled to an electrical system and including switch means and counting means for counting a series of signals indicative of a series of overcurrent values in said system and opening means for opening said switch means in response to said counting means after a predetermined number of said signals occur, the combination comprising:

first circuit means coupled to said system, said first circuit means being movable from a first state during normal operating conditions of said system to a second state in response to the occurrence of an overcurrent in said system to produce one of said signals whereby said counting means is actuated;

second circuit means coupled to said first circuit means and being operative to prevent actuation of said counting means in response to loss of voltage on said system unaccompanied by said overcurrent; and third circuit means responsive to said first circuit means when the latter is in its second state to restrain operation of said second circuit means whereby said first circuit means is permitted to produce one of said signal actuating said counting means.